(12) United States Patent
Priem (10) Patent No.: US 8,180,943 B1
(45) Date of Patent: May 15, 2012

(54) METHOD AND APPARATUS FOR LATENCY BASED THREAD SCHEDULING

(75) Inventor: Curtis R. Priem, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1828 days.

(21) Appl. No.: 10/804,945

(22) Filed: Mar. 19, 2004
(Under 37 CFR 1.47)

Related U.S. Application Data (60) Provisional application No. 60/458,191, filed on Mar. 27, 2003.

(51) Int. Cl.
G06F 13/24 (2006.01)
G06F 9/46 (2006.01)

(52) U.S. Cl. .................. 710/262; 718/103

(58) Field of Classification Search .......... 710/6, 260, 710/262–266; 719/318; 718/102–103, 107–108
See application file for complete search history.

(56) References Cited

U.S. PATENT DOCUMENTS

| | | | |
|---|---|---|---|
| 5,179,702 A * | 1/1993 | Spix et al. ............... | 718/102 |
| 5,469,571 A | 11/1995 | Bunnell | |
| 5,721,922 A | 2/1998 | Dingwall | |
| 5,761,515 A * | 6/1998 | Barton et al. ............ | 717/158 |
| 5,812,844 A * | 9/1998 | Jones et al. ............. | 718/104 |
| 5,826,081 A * | 10/1998 | Zolnowsky ............. | 718/103 |
| 5,828,881 A * | 10/1998 | Wang ..................... | 719/314 |
| 5,903,752 A | 5/1999 | Dingwall et al. | |
| 5,974,438 A * | 10/1999 | Neufeld .................. | 718/104 |
| 6,085,215 A | 7/2000 | Ramakrishnan et al. | |
| 6,341,347 B1 | 1/2002 | Joy et al. | |
| 6,633,897 B1 * | 10/2003 | Browning et al. ...... | 718/103 |
| 2002/0083143 A1 * | 6/2002 | Cheng ................... | 709/208 |

OTHER PUBLICATIONS

"Process Managment—Scheduling". ECEN5043 Software Engineering of Multi-Program Systems. University of Colorado, Boulder. Apr. 1, 2002. pp. 1-50.*
Schwan, Karsten et al. "Dynamic Scheduling of Hard Real-Time Tasks and Real-Time Threads". IEEE Transactions of Software Engineering. vol. 18, No. 8. Aug. 1992. pp. 736-748. 0162-8828/92.*
Burleson, Wayne et al. "The Spring Scheduling Coprocessor: A Scheduling Accelerator". IEEE Transactions of Very Large Scale Integration (VLSI) Systems. vol. 7, No. 1. Mar. 1999. pp. 38-47. 1063-8210/99.*
Buchanan, Matt, "Coordinated Thread Scheduling for Workstation Clusters Under Windows NT", USENIX Windows NT Workshop, 1997.
Denham, Jeffrey M., "DEC OSF/1 Symmetric Multiprocessing", Digital Technical Journal, vol. 6, No. 3.
Jones, Michael B., "The Problems You're Having May Not Be the Problems You Think You're Having: Results from a Latency Study of Windows NT", Microsoft Research, Microsoft Corporation, Technical Report MSR-TR-98-29, Jul. 1998, expanded Mar. 1999.
Smith, Dean, "Interrupt Handler for the IDT79R3051 Riscontroller Family", Application Note AN-131, pp. 103-107, Integrated Device Technology, 1996.
"Windows NT Thread Latency Measurements. Measured Response TImes for the real_time_priority_class", RadiSys, Dec. 1998.

(Continued)

Primary Examiner — Thomas J Cleary
(74) Attorney, Agent, or Firm — Patterson & Sheridan, LLP (57) ABSTRACT

A method and apparatus for providing latency based thread scheduling. A thread attribute, e.g., latency of a process, is used in effecting the scheduling of the thread.

18 Claims, 4 Drawing Sheets

OTHER PUBLICATIONS

"Chapter 9—Interrupts BIOS/DOS/Hardware—Direct Hardware Access", <http://homepages.ius.edu/RWISMAN/C335/HTML/Chapter9.htm>.

"The Neutrino Microkernel", <http://www.qnx.com/developer/docs/qnx_6.1_docs/neutrino/sys_arch/kernel.html>.

Kleidermacher, David, "Safety-Critical Operating Systems," Aug. 31, 2001, <http://www.embedded.com/story/OEG20010829S0055>.

"Chapter 4—Development Environment Notes," *Release Notes*, Digital UNIX Version T4.0-2, Jan. 1996, <http://www.iagu.net/docs/dec/HTML/AA-Q0U4L-TET1_html/relnotes5.html>.

* cited by examiner

METHOD AND APPARATUS FOR LATENCY BASED THREAD SCHEDULING

CROSS-REFERENCE TO RELATED APPLICATION(S)

This application claims priority from commonly owned provisional U.S. Patent Application No. 60/458,191 entitled "METHOD AND APPARATUS FOR LATENCY BASED THREAD SCHEDULING," filed Mar. 27, 2003, having common inventor and assignee as this application, which is incorporated by reference as though fully set forth herein.

FIELD OF THE INVENTION

The present invention relates to a novel method and apparatus for scheduling threads. More specifically, the present invention provides a method that schedules threads based on latency.

BACKGROUND OF THE DISCLOSURE

In programming, a "thread" can be thought of as a minimum "unit of execution" or a basic unit of CPU utilization. The thread model is a flexible process organization mechanism that allows individual processes to access common resources, thereby increasing program efficiency. Namely, a process that has multiple threads of control can perform more than one task at a time. For example, on a single processor machine, this means processing threads on a time-interleaved basis, thereby requiring scheduling. Although the thread model provides the benefit of concurrency of processes, it is up to the operating system or kernel to perform thread scheduling to properly exploit this concurrency.

For example, most operating systems schedule threads to handle interrupts by simply placing them into a queue. The threads are then processed in the order that the threads were scheduled (e.g., threads scheduled to be performed in the order the corresponding interrupts were received). However, this approach does not distinguish the priority of the underlining processes that are performed by the threads in the queue. For example, interrupt threads will be mixed with non-interrupt threads for scheduling.

To address the issue of priority, some advanced operating systems have two queues, where one queue is dedicated to high priority processes and one queue is dedicated to address low priority processes. In this approach, an interrupt thread can be scheduled by being placed in either queue. The threads in the queues are then processed in the order that they were placed in each queue. Although this approach allows the operating system some flexibility in prioritizing the execution of threads, it is still insufficient to allow the operating system to finely schedule threads to account for other parameters, e.g., latency requirement of a particular process.

For example, some real-time devices have "isochronous" requirements, where isochronous denotes "at the same rate", e.g., where a data flow is tied to time. To illustrate, from the perspective of a hardware device that is receiving a stream of real-time data (e.g., audio and video), the hardware device must handle a plurality of interrupts efficiently to address various functions such as buffer management (e.g., detecting fullness of a first buffer, setting up a second buffer, switching from the full buffer to an available empty buffer and the like). In other words, there is a fixed time limit when the first buffer is full and the second buffer must be ready to receive the continuous data stream. Since the data stream is directed toward the hardware device in real time, the hardware device must handle the interrupts skillfully to avoid a "pop" in the audio or a noticeable "glitch" in presenting the video if data packets are lost due to the inability of the hardware device to keep up with the continuous data stream.

Unlike a "closed" system where timing constraints are known a priori, the above timing criticality is further amplified in an open system, where additional hardware devices or boards can be optionally added. The operating system (OS) for the open system must skillfully balance the timing constraints of these different hardware devices so that they can all operate properly without accidental loss of data due to improper handling of interrupt events.

Additionally, operating systems that are designed to distinguish high priority events from low priority events are often defeated by selfish motives of hardware manufacturers. Specifically, device drivers for hardware devices that are deployed in an open system are often written such that their interrupts will always be considered by the operating system to be high priority. Since each hardware device is competing for service by the operating system, there is little incentive to design a device driver that will cause its interrupts to be considered by the operating system as being low priority.

Additionally, even if interrupts from competing hardware devices are truly equal in terms of being in the same priority class, the operating system will not have any additional information to discriminate between numerous interrupt events. In such instances, the interrupts will likely be processed in the order that they are received in the queue, thereby limiting the ability of the operating system to flexibly rearrange the scheduled threads.

Therefore, a need exists for a novel method and apparatus that provides a thread scheduling approach that allows the operating system to finely schedule threads to account for thread parameters or attributes such as latency of a process and the like.

SUMMARY OF THE INVENTION

In one embodiment of the present invention, a novel method and apparatus for providing latency based thread scheduling is disclosed. Specifically, a thread attribute, e.g., latency of a process, is used in effecting the scheduling of the thread.

Using interrupt handling as an example, if an interrupt requests that a thread be scheduled to process the interrupt, then the interrupt scheduler will pass a latency value (e.g. in usec) to the operating system. The operating system will, in turn, apply this thread attribute to correctly organize all pending threads in an efficient order such that a thread that needs to be processed the soonest will be scheduled first.

In one embodiment, the operating system may take the latency value and add it to the current time to acquire an absolute time that the thread will need to be woken up. Using this novel approach, low priority processes, e.g., non-interrupt based scheduled threads, will have a very high (e.g. infinite) latency value such that these low priority threads will always be scheduled after high priority threads (e.g., interrupt threads). This novel approach provides a very finely tuned thread scheduling method, where the operating system can exploit a thread attribute such as latency in arranging the order in which pending threads will be processed.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
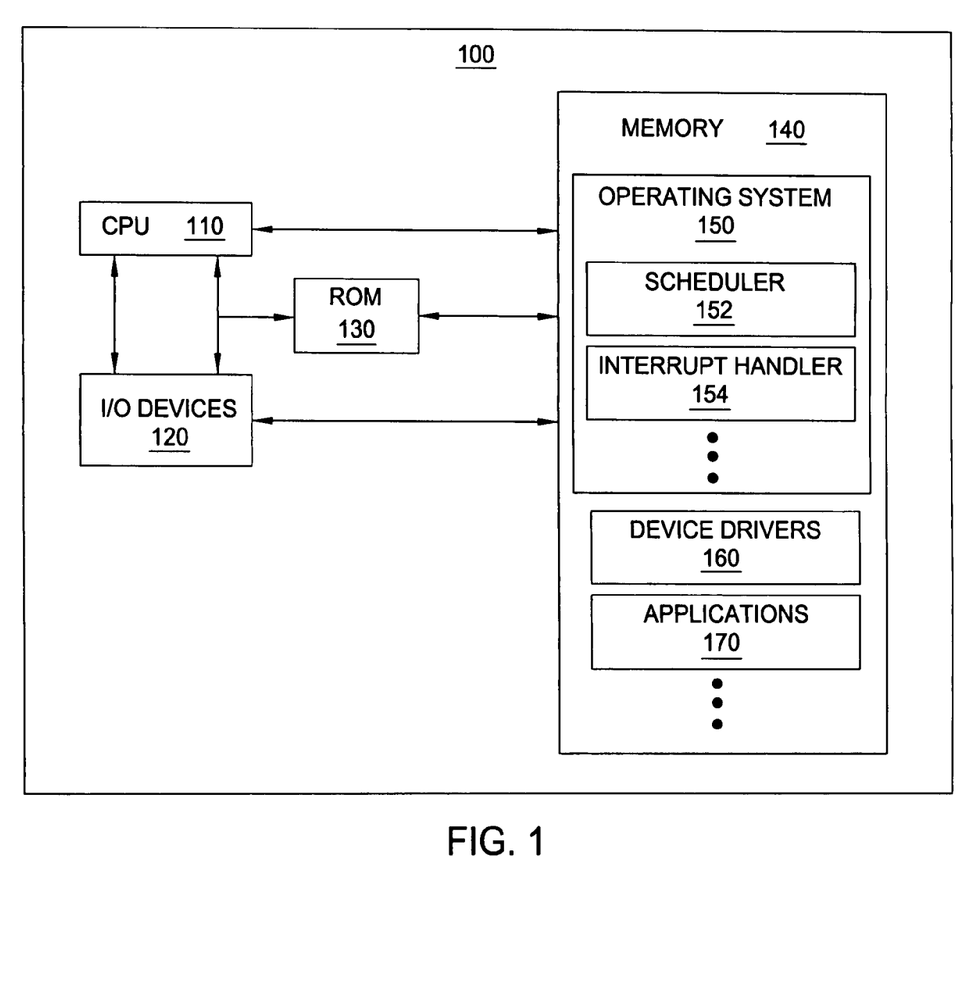
FIG. 1 illustrates a block diagram of a system for providing latency based thread scheduling of the present invention.

FIG. 1 illustrates a block diagram of a system for providing latency based thread scheduling of the present invention. Specifically, FIG. 1 illustrates a system 100 of the present invention as implemented using a general purpose computer. The computer system 100 comprises a processor (CPU) 110, a memory 140, e.g., random access memory (RAM), a read only memory (ROM) 130, and various input/output devices 120, (e.g., storage devices, including but not limited to, a tape drive, a floppy drive, a hard disk drive, a compact disk (CD) drive or a digital videodisk (DVD) drive, a receiver, a transmitter, a speaker, a display, a speech signal input device, e.g., a microphone, a keyboard, a keypad, a mouse, an A/D converter, a chipset, a controller card, a graphics card, a sound card, and the like).

In brief, an operating system 150, device drivers 160 and user applications 170 are loaded into the memory 140 and operated by the CPU 110. In one embodiment, the operating system 150 comprises a plurality of software modules, including by not limited to a thread scheduler 152 and an interrupt handler 154. The thread scheduler 152 is employed to schedule threads for supporting multithreaded applications, whereas the interrupt handler 154 is employed to implement an interrupt service routine. It should be noted that although the thread scheduler 152 and the interrupt handler 154 are illustrated as separate modules, the present invention is not so limited. Namely, those skilled in the art will realize that the functions performed by these modules can be implemented in a single module, e.g., within an "interrupt scheduler", or serving as a part of a much larger software module.

In operation, a thread attribute, e.g., latency of a process, is used in affecting the scheduling of the thread. Although the present invention is described below within the context of coordinating thread scheduling to handle interrupts, those skilled in the art will realize that the present invention can be adapted to address thread scheduling in general. Any multithreaded real-time computing environment can make use of this invention. The invention is particularly useful for multimedia applications.

Using interrupt handling as an example, if an I/O device 120 issues an interrupt request via a device driver 160, the thread scheduler 152 will schedule a thread to process the interrupt. Specifically, in one embodiment of the present invention, the interrupt handler 154 or optionally, the device driver 160, will pass a latency value (e.g. in usec) to the operating system 150. The operating system will, in turn, apply this thread attribute to correctly organize all pending threads in an efficient order such that a thread that needs to be processed the soonest will be scheduled first.

In one embodiment, the operating system may take the latency value and add it to the current time to acquire an absolute time that the thread will need to be woken up and processed. Using this novel approach, low priority processes, e.g., non-interrupt based scheduled threads, will have a very high (e.g. infinite) latency value such that these low priority threads will always be scheduled after high priority threads (e.g., interrupt threads). This novel approach provides a very finely tuned thread scheduling method, where the operating system can exploit a thread attribute such as latency in arranging the order in which pending threads will be processed.

Thus, it should be understood that the thread scheduler 152, interrupt handler 154 and the device drivers 160 can be implemented as one or more physical devices (e.g., registers and ROMs) that are coupled to the CPU 110 through a communication channel. Alternatively, the thread scheduler 152, interrupt handler 154 and the device drivers 160 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 140 of the computer. Alternatively, the thread scheduler 152, interrupt handler 154 and the device drivers 160 can be represented by Field Programmable Gate Arrays (FPGA) having control bits. As such, the thread scheduler 152, interrupt handler 154 and the device drivers 160 (including associated methods and data structures) of the present invention can be stored on a computer readable medium, e.g., RAM memory, magnetic or optical drive or diskette and the like.

Figure 2:
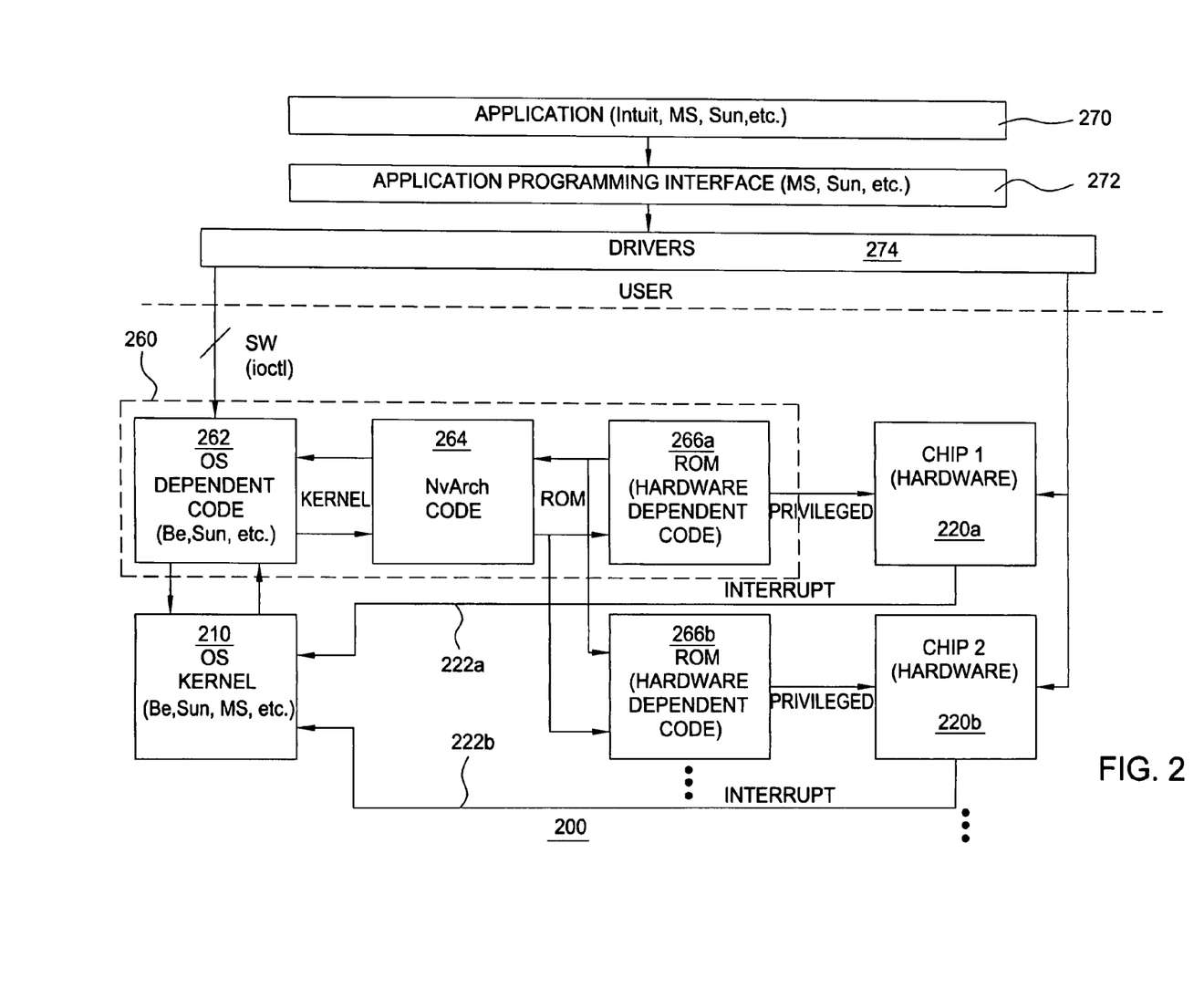
FIG. 2 illustrates an alternate block diagram of a system for providing latency based thread scheduling of the present invention.

FIG. 2 illustrates an alternate block diagram of a system 200 for providing latency based thread scheduling of the present invention. In one exemplary embodiment, FIG. 2 illustrates the specific interaction between the operating system or kernel 210 and various hardware devices 220a-b and software applications 270.

FIG. 2 also illustrates a user boundary (dashed line) where the user applications 270, application programming interface 272 and various software drivers 274 are typically accessible by the user of the overall system, whereas the region below the dashed line can be broadly perceived as being on the "kernel and hardware" side that is not accessible by the user. It should be noted that although the present latency based thread scheduling will be disclosed below in terms of hardware interrupts, the present invention is not so limited. Those skilled in the art will realize that the present invention is equally applicable to the scheduling of threads that are generated in response to a software application 270.

FIG. 2 illustrates an operating system kernel 210 that interfaces with a device driver or portion of a device driver 260. In one embodiment, the device driver 260 is implemented with an OS dependent code or module 262, an NvArch code or module 264 and a hardware dependent code 266a (shown embodied within a ROM). The hardware dependent code 266a tracks a corresponding hardware device, e.g., a chip1 220a. As such, a second hardware dependent code 266b within a ROM is deployed to track a second hardware device, e.g., a chip2 220b and so on if additional hardware is deployed.

Unique changes or operational constraints affecting a particular chip will be handled and noted by its corresponding hardware dependent code 266. Thus, the hardware dependent code 266 can accurately identify the latency associated with its own hardware device. This is due to the fact that latency may be associated with clock rate, display rate, buffer size and so on. These important information are tracked by the hardware dependent code 266 stored in a ROM in one embodiment. The use of this latency information to effect latency based thread scheduling will be further described below.

Each of the hardware devices is provided with a direct interrupt line 222 to the OS kernel 210 (or more accurately, to the controller circuitry that is in communication with the OS kernel). Once the interrupt line 222 is set by a hardware device, a series of communication will follow between the device driver 260 and the OS kernel 210. In one embodiment, this communication is implemented via various "calls".

The first call is known as "INTERRUPT_ALLOC" (nvOsCallback(NvOs8a0 Parameters *)) which is a callback to allocate an interrupt. The allocation nvOsCallback( ) normally occurs when a device is allocated for the first time, e.g., when the hardware is being initialized.

In operation, the NV Architecture code 264 calls the operating system dependent code 262 to allocate a real-time interrupt. Normally the operating system dependent code 262 allocates appropriate data structures and then connects the interrupt. The NV Architecture allows multiple interrupts per device since each device contains many real-time engines. Some non-real-time operating systems can only schedule one thread or one thread per device. Real-time operating systems should create a thread for each interrupt allocated. The operating system 210 should attempt to service each allocated interrupt separately to ensure more predictable results.

The NV Architecture can make an nvOsCallback( ) with the following parameter members:
NvOs8a0 Parameters
 This data structure contains the input and output parameters for the nvOsCallback( ) function.
 "function"
 This field contains the function number.
 The argument is a 32 bit void number. Legal argument values are:
  0x000008A0 NVOS 8A0_INTERRUPT_ALLOC
  The argument is returned unchanged.
 "status"
 This field returns the status.
 The argument is a 32 bit void number. All argument values are legal.
 Possible returned values are:
  0x00000000 NVOS 8A0_STATUS_SUCCESS
  0x00000001 NVOS 800_STATUS_ERROR_BAD_FUNCTION
  0x00000002 NVOS8A0_STATUS_ERROR_INSUFFICIENTRESOURCES
  0x00000003 NVOS8A0_STATUS_ERROR_BAD_INTERRUPT_ID
 "interruptId"
 This field contains the identification number of the interrupt.
 The argument is a 32 bit void number. The argument values must not be equal to the interruptId of a previously allocated interrupt.
 The argument is returned unchanged.

The second call is known as "INTERRUPT_FREE" (nvOsCallback(NvOs8a1 Parameters *)) which is a callback to free an interrupt. Specifically, the NV architecture code 264 calls the operating system dependent code to free a real-time interrupt. The free nvOsCallback normally occurs when the last usage of a device is freed. Namely, if a hardware device is being shut down, it is necessary to free up all those resources and data structures that were created and validated for the hardware device.

NvOs8a1 Parameters
 This data structure contains the input and output parameters for the nvOsCallback( ) function.
 "function"
 This field contains the function number.
 The argument is a 32 bit void number. Legal argument values are:
  0x000008A1 NVOS 8A1_INTERRUPT_FREE
  The argument is returned unchanged.
 "status"
 This field returns the status.
 The argument is a 32 bit void number. All argument values are legal.
 Possible returned values are:
  0x00000000 NVOS 8A1_STATUS_SUCCESS
  0x00000001 NVOS 800_STATUS_ERROR_BAD_FUNCTION
  0x00000002 NVOS8A1_STATUS_ERROR_BAD_INTERRUPT_ID
 "interruptId"
 This field contains the identification number of the interrupt.
 The argument is a 32 bit void number. The argument values must be equal to the interruptId of a previously allocated interrupt.
 The argument is returned unchanged.

The third call is known as "INTERRUPT_SCHEDULE" (nvOsCall(NvOs0a0 Parameters *)) which is a call to schedule interrupts. This call is an nvOsCall( ) from the operating system dependent code 262 to the NV Architecture code 264 to schedule interrupts. Specifically, the nvOsCall( ) should be made when the operating system 210 notifies the operating system dependent code 262 that a device 220 may have some pending interrupts that require servicing. In advanced operating systems, a thread should be scheduled with a priority corresponding to NvOs0a0 Parameters.latency for each interrupt that needs servicing. INTERRUPT_SCHEDULE should be continuously called until NvOs0a0 Parameters.status returns ERROR_NO_MORE_INTERRUPTS.

NvOs0a0 Parameters
 This data structure contains the input and output parameters for the nvOsCall( ) function.
 "function"
 This field contains the function number.
 The argument is a 32 bit void number. Legal argument values are:
  0x000000A0 NVOS 0A0_INTERRUPT_SCHEDULE
  The argument is returned unchanged.
 "status"
 This field returns the status.
 The argument is a 32 bit void number. All argument values are legal.
 Possible returned values are:
  0x00000000 NVOS0A0_STATUS_SUCCESS
  0x00000001 NVOS000_STATUS_ERROR_BAD_FUNCTION
  0x00000002 NVOS0A0_STATUS_ERROR_NO_INTERRUPTS
 "interruptId"
 This field contains the identification number of the interrupt.
 The argument is a 32 bit void number. All argument values are legal.
 The argument returns the identification number of the interrupt to be scheduled.
 "latency"
 This field returns the maximum latency until the service nvOsCall( ) must be called or else the hardware device's real-time engines may not be able to keep up with isochronous data streams.
 The argument is a 32 bits unsigned integer, measured in nanoseconds.

All argument values are legal.

The argument returns maximum latency in nanoseconds of the service routine.

The fourth call is known as "INTERRUPT_SERVICE" (nvOsCall(NvOs0a1 Parameters *)) which is a call to service interrupts. This call is an nvOsCall( ) from the operating system dependent code 262 to the NV Architecture code 264 to service an interrupt. Specifically, the nvOsCall( ) should be used to request servicing of the specified interrupt as determined by a previous call to INTERRUPT_SCHEDULE. Namely, the operating system is simply calling to each device driver 260 to go ahead and process your interrupts.

NvOs0a1 Parameters

This data structure contains the input and output parameters for the nvOsCall( ) function.

"function"

This field contains the function number.

The argument is a 32 bit void number. Legal argument values are:

0x000000A1 NVOS 0A1_INTERRUPT_SERVICE

The argument is returned unchanged.

"status"

This field returns the status for this operation.

The argument is a 32 bit void number. All argument values are legal.

Possible returned values are:

0x00000000 NVOS0A1_STATUS_SUCCESS

0x00000001 NVOS000_STATUS_ERROR_BAD_FUNCTION

0x00000002 NVOS0A1_STATUS_ERROR_BAD_INTERRUPT_ID

"interruptId"

This field contains the identification number of the interrupt.

The argument is a 32 bit void number. The argument values must be equal to the interrupted of a previously allocated interrupt.

The argument is returned unchanged.

It should be noted that the various calls and their structures as disclosed above are only illustrative. In fact, the specific structure of the device driver 260 as having an OS dependent code 262, an NV Architecture code 264 and a hardware dependent code 266 are illustrative of one particular embodiment. Those skilled in the art will realize that these modules or codes can be implemented in different manners, e.g., being partially or wholly incorporated within the OS kernel 210.

Figure 3:
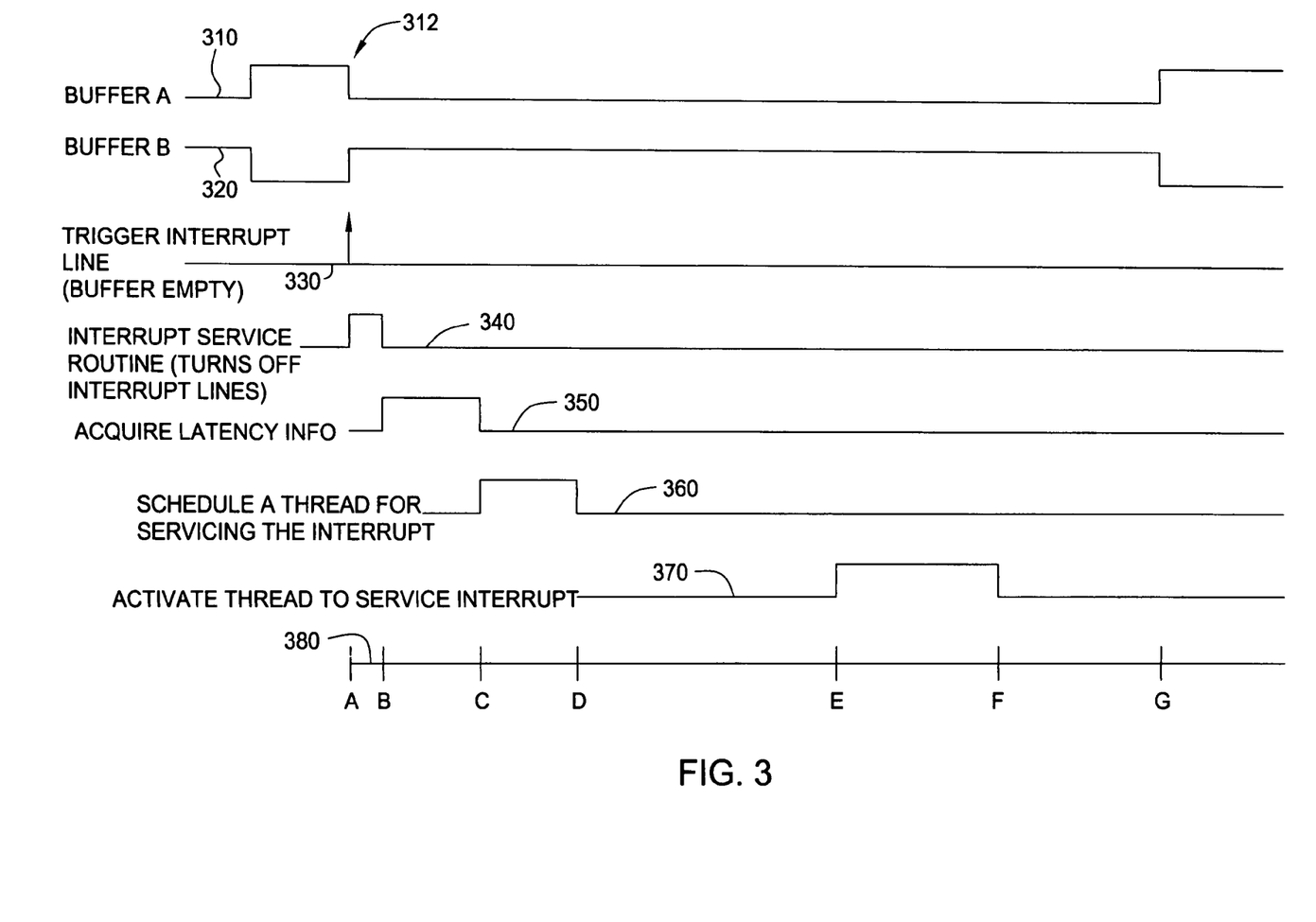
FIG. 3 illustrates a time line diagram for scheduling a latency based thread.

FIG. 3 illustrates a time line diagram for scheduling a latency based thread. In describing this time line, FIG. 3 can also serve as a flowchart for a method for scheduling a latency based thread.

Specifically, FIG. 3 illustrates a time line diagram that describes the scheduling of a latency based thread for swapping buffers, e.g., as in a vertical retrace operation. FIG. 3 illustrates at time line 310 where buffer A is being read and is reaching the point of being emptied at point 312, where the read operation transitions from buffer A to buffer B as shown in time line 320. Namely, at point 312, buffer A is completely emptied and data is now being read from buffer B instead.

In time line 330, the hardware device triggers an interrupt to the OS, e.g., via interrupt line 222a. Responsive to the hardware device, the OS in time line 340 toggles all the other interrupt lines 222b-n to the "off" position briefly to record the interrupt number on interrupt line 222a. During this short period, the OS will not acknowledge any other interrupt lines. Once the interrupt information is captured, the OS will toggle all the interrupt lines back to the "on" position so that it can detect and receive the next interrupt. This approach accords the OS the ability to minimize the amount of time where interrupt lines are actually turned off.

It should be noted that most CPUs have two interrupt request lines. One is the "nonmaskable" interrupt, which is reserved for events such as unrecoverable memory errors. The second interrupt line is "maskable", where it can be turned off by the CPU before the execution of critical instruction sequences that must not be interrupted. The maskable interrupt is typically used by device controllers to request service. Thus, the present invention only masks interrupts for the short period during of logging of the interrupt events, minimizing the likelihood of that a maskable or nonmaskable interrupt will be received and ignored. Furthermore, subsequent processing steps such as computing a latency value or the scheduling of a thread are performed without masking interrupts. In some embodiments of the invention, nonmaskable interrupts are not masked during the logging of the interrupt events.

In time line 350, the hardware dependent code will acquire and provide latency information or a latency value associated with setting up the next buffer. This latency information can be a predefined value associated with a particular interrupt number or it can be calculated in accordance with an equation. In the present example, the equation can be formulated as having parameters associated with "buffer size", "sampling rate", "data transmission rate" and the like.

In time line 360, the latency information provided by the hardware dependent code is used by the thread scheduler of the operating system to schedule the thread to be serviced at some future time. In other words, the thread scheduler 152 has now exploited the latency information such that interrupts are not necessarily serviced in the order that they are received by the operating system. In fact, the thread scheduler has the necessary information to now rearrange various threads in the queue such that threads that require faster service based on latency will be processed ahead of other threads that can wait a bit longer.

In time line 370, the thread is actually awoken to perform the interrupt service. Finally, time line 380 illustrates various time segments that can be used to formulate the latency information. For example, the time duration between points "a-g" can be used as the latency information in scheduling the thread because it represents the maximum time allowed before buffer B will be emptied and the read operation will switch back to buffer A. Alternatively, the time duration between points "e-f" can be used as the latency information in scheduling the thread because it represents the time necessary to service the interrupt, i.e. process the thread. Yet another alternative is to use the time duration between points "a-d" because it represents the time duration that is necessary to setup a thread to service the interrupt. In fact, the latency information can be derived from various segments of this time line or other criteria to implement the present latency based thread scheduling.

Figure 4:
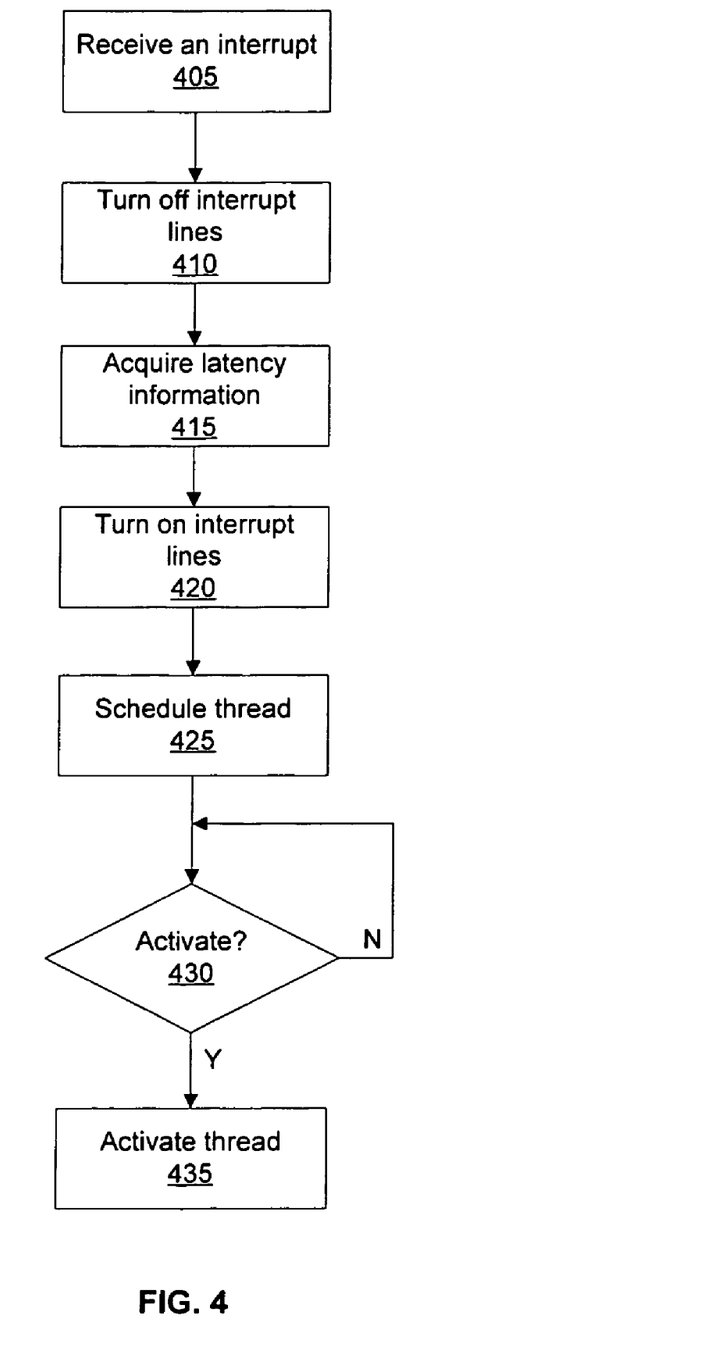
FIG. 4 illustrates a flowchart for a method for scheduling a latency based thread.

FIG. 4 illustrates a flowchart for a method for scheduling a latency based thread. In step 405 an I/O device, such as I/O device 120 issues an interrupt request via a device driver, such as device driver 16. The interrupt request is received by the operating system 150. Alternatively, in step 405, a hardware device, such as chip 1 220a or chip 2 220b sets interrupt line 222a or interrupt line 222b, respectively and the operating system kernel 210 receives an interrupt.

In step 410 operating system 150 or operating system kernel 210 masks, i.e. turns off, any other interrupt lines not corresponding to the interrupt line which was set in step 405. In step 415, a series of communication between the device driver 160 and operating system 150 occurs to in order for the scheduler 152 to acquire the latency information related to the hardware device generating the interrupt. In some embodiments the scheduler 152 may compute a latency value based on the latency information. In other embodiments the latency information includes a latency value.

Alternatively, in step 415 a series of communication between the device driver 260 and the operating system kernel 210 occurs to acquire the latency information. The communication may include calls requesting allocation of an interrupt, freeing of an interrupt, scheduling of an interrupt, or the like. In step 420 the operating system 150 or the operating system kernel 210 unmasks, i.e. turns on, the interrupt lines turned off in step 410. In step 425 the scheduler 152 or a thread scheduler within the operating system dependent code 262 schedules a thread to process the interrupt received in step 405. Specifically, in one embodiment of the present invention, the interrupt handler 154 or optionally, the device driver 160, passes a latency value specified in real time units, e.g., nanoseconds, microseconds, or the like, to the scheduler 152. The scheduler 152 will, in turn, apply this thread attribute to organize all pending threads in an efficient order such that the thread and the pending threads will be processed within the latency constraints specified for each thread.

In step 430 the scheduler 152 or the thread scheduler with the operating system dependent code 262 determines if the thread scheduled in step 425 should be activated based on the latency information or an absolute time determined using a latency information, and, if not, step 430 is repeated. Otherwise, the scheduler 152 or the thread scheduler within the operating system dependent code 262 activates the thread scheduled in step 425, for example by communicating a service interrupt from the operating system 150 to the I/O devices 120 or from the operating system dependent code 262 to the hardware device associated with the thread.

Although various embodiments which incorporate the teachings of the present invention have been shown and described in detail herein, those skilled in the art can readily devise many other varied embodiments that still incorporate these teachings. In the claims, elements of method claims are listed in a particular order, but no order for practicing of the invention is implied, even if elements of the claims are numerically or alphabetically enumerated.

What is claimed is:

1. Method for scheduling the service of a thread, said method comprising the steps of:
   creating the thread when a first hardware device of hardware devices is initialized, wherein the thread is created for use during processing of a first interrupt that the first hardware device is configured to generate;
   freeing the thread when the first hardware device is shut down;
   masking interrupts from the hardware devices in order to ignore interrupts for other threads;
   acquiring a latency information associated with the thread, wherein the latency information indicates a time at which the thread needs to be processed;
   unmasking interrupts from the hardware devices in order to detect interrupts for the other threads;
   rearranging an order in which the thread and the other threads will be serviced in a single queue to schedule the thread for processing in accordance with said latency information, wherein the rearranging is performed simultaneously for the thread and the other threads, and the thread and the other threads that are ordered in the single queue correspond to all requests received from the hardware devices; and
   creating an additional thread, wherein a first interrupt identification number is associated with the thread and a second interrupt identification number that is different than the first interrupt identification number is associated with the additional thread and the additional thread is created for use during processing of a second interrupt that the first hardware device is configured to generate; and
   freeing the additional thread when the first hardware device is shut down.

2. The method of claim 1, wherein said latency information is computed based on a buffer size or display rate.

3. The method of claim 1, further comprising computing the time at which the thread needs to be processed by summing the latency information with a current time.

4. The method of claim 1, wherein said latency information represents a time duration that is necessary to service the thread.

5. The method of claim 1, wherein said latency information represents a maximum time allowed before a first buffer will be emptied and a read operation will switch to process a second buffer.

6. The method of claim 1, wherein said latency information represents a time duration that is necessary to setup the thread to perform interrupt processing for the thread.

7. The method of claim 1, wherein said latency information is dependent on a hardware constraint for one of the hardware devices.

8. The method of claim 1, wherein said latency information is provided by a device driver.

9. The method of claim 1, further comprising toggling an interrupt line.

10. The method of claim 1, further comprising:
    determining the thread should be activated; and
    activating the thread for processing.

11. The method of claim 1, wherein the thread and at least one of the other threads correspond to interrupt requests from a single one of the hardware devices.

12. Apparatus for scheduling the service of a thread, said apparatus comprising:
    means for creating the thread when a first hardware device of hardware devices is initialized, wherein the thread is created for use during processing of a first interrupt that the first hardware device is configured to generate;
    means for freeing the thread when the first hardware device is shut down;
    means for receiving an interrupt from the first hardware device;
    means for masking interrupts from the hardware devices in order to ignore interrupts for other threads;
    means for acquiring latency information associated with the interrupt, wherein the latency information indicates a time at which the thread needs to be processed;
    means for unmasking interrupts from the hardware devices in order to detect interrupts for the other threads;
    means for rearranging an order in which the thread and the other threads will be serviced in a single queue to schedule the thread to process the interrupt in accordance with said latency information, wherein the rearranging is performed simultaneously for the thread and the other threads, and the thread and the other threads that are ordered in the single queue correspond to all requests received from the hardware devices; and
    means for creating an additional thread, wherein a first interrupt identification number is associated with the thread and a second interrupt identification number that is different than the first interrupt identification number is associated with the additional thread and the additional thread is created for use during processing of a second interrupt that the first hardware device is configured to generate; and means for freeing the additional thread when the first hardware device is shut down.

13. The apparatus of claim 12, further comprising computing the time at which the thread needs to be processed by summing the latency information with a current time.

14. The apparatus of claim 12, wherein said latency information is dependent on a hardware constraint for one of the hardware devices.

15. The apparatus of claim 14, wherein said hardware constraint is a size of a buffer.

16. The apparatus of claim 14, wherein said hardware constraint is a fullness of a buffer.

17. The apparatus of claim 14, wherein said hardware constraint is dynamically computed based on a buffer size or display rate.

18. The apparatus of claim 12, wherein said latency information is generated by a device driver associated with the hardware device.

* * * * *